US012299157B2

(12) United States Patent
Baba et al.

(10) Patent No.: US 12,299,157 B2
(45) Date of Patent: May 13, 2025

(54) POLICY SETTING CONTROL DEVICE, POLICY SETTING CONTROL METHOD, AND POLICY SETTING CONTROL PROGRAM

(71) Applicant: Hitachi, Ltd., Tokyo (JP)

(72) Inventors: Tsunehiko Baba, Tokyo (JP); Jumpei Okoshi, Tokyo (JP); Hiroaki Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 463 days.

(21) Appl. No.: 17/945,958

(22) Filed: Sep. 15, 2022

(65) Prior Publication Data

US 2023/0281329 A1 Sep. 7, 2023

(30) Foreign Application Priority Data

Mar. 16, 2022 (JP) .................................. 2022-041067

(51) Int. Cl.
G06F 21/00 (2013.01)
G06F 21/62 (2013.01)

(52) U.S. Cl.
CPC .............................. G06F 21/6218 (2013.01)

(58) Field of Classification Search
None
See application file for complete search history.

(56) References Cited

U.S. PATENT DOCUMENTS 10,430,594 B2 * 10/2019 Florentino .......... G06F 21/6218
10,997,315 B2 * 5/2021 Barday .............. G06Q 30/0203
11,126,748 B2 * 9/2021 Brannon ............... G06F 21/602
11,222,142 B2 * 1/2022 Jones ...................... G06F 21/60
11,341,447 B2 * 5/2022 Brannon ............... G06F 21/552

(Continued)

FOREIGN PATENT DOCUMENTS

| JP | 2012-108629 A | 6/2012 |
| JP | 2014-519131 A | 8/2014 |
| WO | 2014/049741 A1 | 4/2014 |

OTHER PUBLICATIONS

Uddin, Mumina et al. A Dynamic Access Control Model Using Authorising Workflow and Task-Role-Based Access Control. IEEE Access, vol. 7. https://ieeexplore.ieee.org/stamp/stamp.jsp?tp=&arnumber=8868170 (Year: 2019).*

(Continued)

*Primary Examiner* — Jeremiah L Avery
(74) *Attorney, Agent, or Firm* — MATTINGLY & MALUR, PC

(57) ABSTRACT

A policy can be easily and appropriately set. A policy setting control device 100 that controls setting of a policy for controlling access to a resource includes a processor. The policy includes a resource to be accessed, a subject who accesses the resource, and an access operation. The processor receives an input policy 11 which is a candidate to be newly set, acquires an attribute value corresponding to values of a subject and a resource included in the input policy 11, generates one or more post-conversion policies 103 by changing the values of the subject and the resource included in the input policy 11 to the acquired attribute value, and sets the input policy as a new policy when all the generated post-conversion policies 103 are consistent with an existing policy.

13 Claims, 9 Drawing Sheets

(56) References Cited

U.S. PATENT DOCUMENTS

| | | | | |
|---|---|---|---|---|
| 11,392,720 | B2* | 7/2022 | Brannon | G06F 21/602 |
| 11,586,762 | B2* | 2/2023 | Barday | G06F 21/604 |
| 11,595,372 | B1* | 2/2023 | Sharifi Mehr | H04L 63/20 |
| 11,636,171 | B2* | 4/2023 | Brannon | G06F 16/951 |
| | | | | 715/234 |
| 11,675,929 | B2* | 6/2023 | Brannon | G06Q 10/0637 |
| | | | | 726/30 |
| 11,727,141 | B2* | 8/2023 | Brannon | G06F 11/3006 |
| | | | | 717/101 |
| 2014/0096188 | A1 | 4/2014 | Mont et al. | |
| 2015/0199506 | A1 | 7/2015 | Gouda | |
| 2015/0220659 | A1* | 8/2015 | Rissanen | G06F 21/6218 |
| | | | | 707/759 |
| 2018/0020001 | A1* | 1/2018 | White | G06F 21/602 |
| 2019/0050575 | A1* | 2/2019 | Abraham | G06F 21/604 |
| 2019/0258811 | A1* | 8/2019 | Ferraiolo | G06F 21/6218 |
| 2019/0392657 | A1* | 12/2019 | Hadzic | G06F 21/604 |
| 2020/0028854 | A1* | 1/2020 | Fabrizi | G06F 16/2471 |
| 2020/0412726 | A1* | 12/2020 | Nevatia | H04L 63/102 |
| 2021/0034734 | A1* | 2/2021 | Rohde | G06F 21/44 |
| 2021/0081358 | A1* | 3/2021 | Khurana | G06F 9/546 |
| 2021/0303714 | A1* | 9/2021 | Yaghoobi | G06N 3/08 |
| 2022/0150256 | A1* | 5/2022 | Kapoor | G06F 21/6218 |
| 2022/0292211 | A1* | 9/2022 | Reineke | G06F 21/6218 |

OTHER PUBLICATIONS

Shu, Cheng-chun et al. Detecting Conflicts in ABAC Policies with Rule-Reduction and Binary-Search Techniques. 2009 IEEE International Symposium on Policies for Distributed Systems and Networks. https://ieeexplore.ieee.org/stamp/stamp.jsp?tp=& arnumber=5197406 (Year: 2009).*

Dan, Ni et al. Attribute Based Access Control (ABAC)—Based Cross-Domain Access Control in Service-Oriented Architecture (SOA). 2012 International Conference on Computer Science and Service System. https://ieeexplore.ieee.org/stamp/stamp.jsp?tp=& arnumber=6394592 (Year: 2012).*

* cited by examiner

POLICY SETTING CONTROL DEVICE, POLICY SETTING CONTROL METHOD, AND POLICY SETTING CONTROL PROGRAM

CROSS-REFERENCE TO RELATED APPLICATION

The present application claims priority from Japanese application JP2022-041067, filed on Mar. 16, 2022, the contents of which is hereby incorporated by reference into this application.

TECHNICAL FIELD

The present invention relates to a technique for controlling setting of a policy of access to a resource in which data is stored.

BACKGROUND ART

For example, in a company, when organizational changes or personnel changes are performed, user attribute information, which is identity information relating to users, is updated. Accordingly, in an information system used in the company, an operation of updating a policy related to access to data and an operation of updating a system environment are required. In general, the operation of updating a policy and the operation of updating a system environment are performed manually.

The policy related to access to data includes, for example, a subject such as a user, an operation such as an access method, and a resource such as a data store, and includes these elements and attributes. In the information system, policies of different systems are used depending on management purposes such as master data management, security and privacy management, and life cycle management. In data governance, it is essential to maintain consistency of the policies in these different systems.

As a technique related to a policy, for example, a service is known in which policy inputs are collected from a plurality of layers of an organization and a security policy having consistency is generated over the plurality of layers of the organization (see PTL 1). A technique is known in which, when there are policies corresponding to objects having a hierarchical relation, the hierarchical relation between the objects is associated in advance, and for a policy corresponding to any object, an upper object in the hierarchical relation is specified based on the object corresponding to the policy, and the presence or absence of consistency with a corresponding counterpart policy is determined and output (see PTL 2). A system is known which includes: a policy storage device that stores a plurality of policies, each of which includes at least one condition describing user attribute information in which a plurality of items including at least a second user ID corresponding to a first user ID are associated with each other, and defines authority to use a service that permits to use the service when a value of the user attribute information satisfies the condition; a policy update device capable of updating each stored policy when the user attribute information is changed; and a user attribute information storage device that stores user attribute information after the change and change content for each second user ID including the value of the user attribute information before the change and a value of the user attribute information after the change (see PTL 3).

CITATION LIST

Patent Literature

PTL 1: JP-T-2014-519131
PTL 2: JP-A-2012-108629
PTL 3: WO 2014/049741

SUMMARY OF INVENTION

Technical Problem

When setting a new policy, it is necessary to be consistent with an existing policy, but it is often troublesome and difficult to understand and set such a policy.

The invention has been made in view of the above circumstances, and an object of the invention is to provide a technique capable of easily and appropriately setting a policy.

Solution to Problem

In order to achieve the above object, a policy setting control device according to one aspect is a policy setting control device for controlling setting of a policy for controlling access to a resource. The policy setting control device includes a processor. The policy includes a resource to be accessed, a subject who accesses the resource, and an access operation. The processor receives input of a candidate policy which is a candidate to be newly set, acquires an attribute value corresponding to values of a subject and a resource included in the candidate policy, generates one or more post-conversion policies by changing the values of the subject and the resource included in the candidate policy to the acquired attribute value, and sets the candidate policy as a new policy when all the generated post-conversion policies are consistent with an existing policy.

Advantageous Effects of Invention

According to the invention, a policy can be easily and appropriately set.

DESCRIPTION OF EMBODIMENTS

Embodiments will be described with reference to the drawings. The embodiments described below do not limit the invention according to the claims, and all elements and combinations thereof described in the embodiments are not necessarily essential to the solution of the invention.

In the following description, although information is described by an expression of "AAA table", the information may be expressed in any data structure. That is, in order to indicate that the information does not depend on the data structure, the "AAA table" may be referred to as "AAA information".

Figure 1:
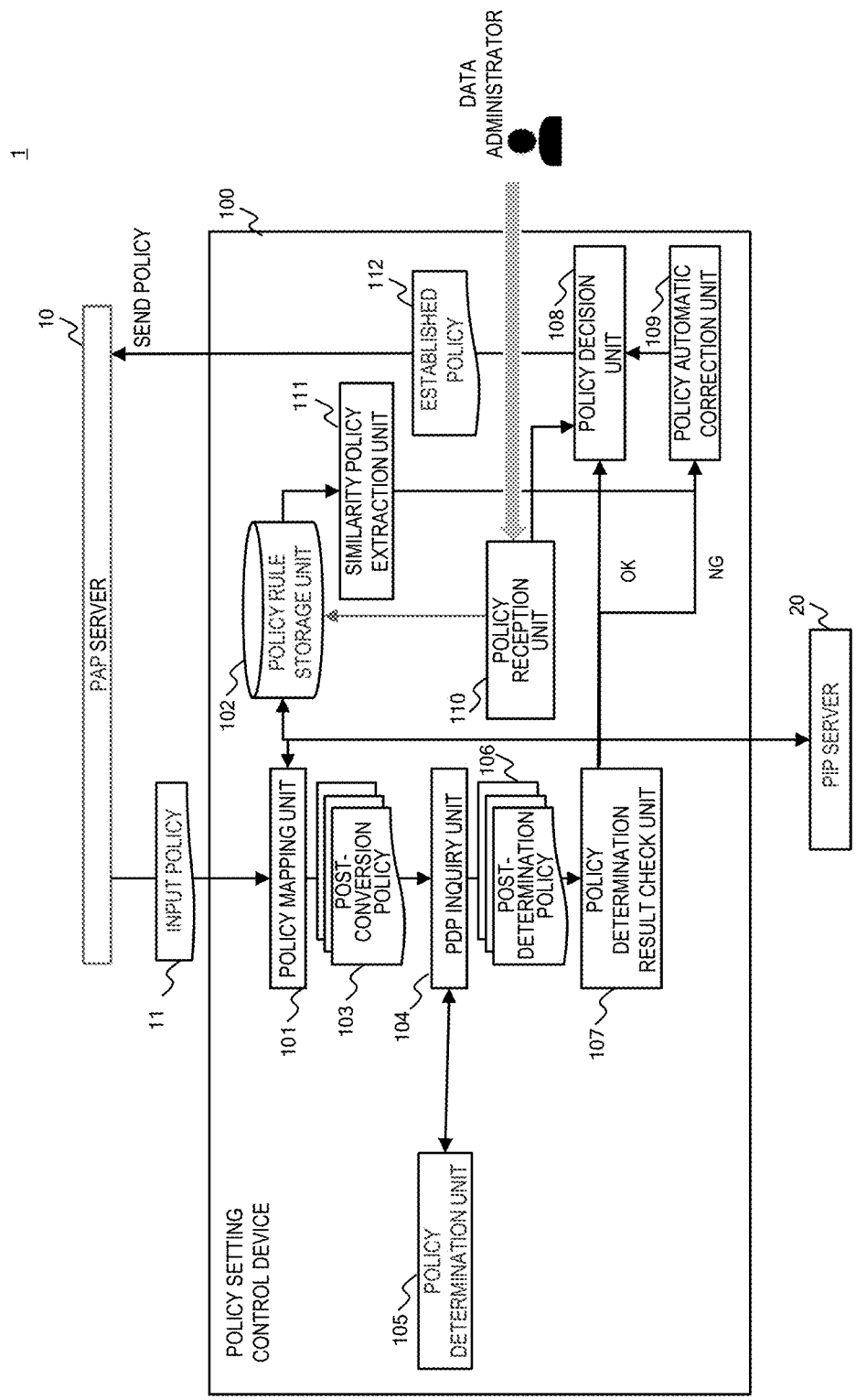
FIG. 1 is an overall configuration diagram of a policy utilization system according to one embodiment.

FIG. 1 is an overall configuration diagram of a policy utilization system according to a first embodiment.

A policy utilization system 1 includes a policy administration point (PAP) server 10, a policy setting control device 100, and a policy information point (PIP) server 20. The PAP server 10, the policy setting control device 100, and the PIP server 20 are connected via, for example, a wide area network (WAN) or a local area network (LAN).

The PAP server 10 manages an access control policy for a resource that manages data. Specifically, the PAP server 10 receives an instruction of an operation for a resource from a subject who utilizes the resource, determines whether to allow the operation instructed to the resource, and allows the operation for the resource from the subject when determining that the operation is allowed. The PIP server 20 manages a subject, a resource, attribute information of various environments, and the like.

The policy setting control device 100 includes a policy mapping unit 101, a policy rule storage unit 102, a PDP inquiry unit 104, a policy determination unit 105, a policy determination result check unit 107, a policy decision unit 108, a policy automatic correction unit 109, a policy reception unit 110, and a similarity policy extraction unit 111.

The policy rule storage unit 102 stores a rule (policy rule) that can specify a policy used by the PAP server 10. The policy rule may include a plurality of policies used by the PAP server 10. In this case, a policy may be acquired from the PAP server 10 at any timing.

The policy mapping unit 101 receives an input policy 11 which is a candidate (candidate policy) from the PAP server 10, refers to the policy rule stored in the policy rule storage unit 102, acquires necessary attribute information corresponding to the input policy 11 from the PIP server 20, and generates post-conversion policies 103 to which the acquired attribute information is applied to the input policy 11.

The PDP inquiry unit 104 inquires of the policy determination unit 105 whether each of the post-conversion policies 103 conforms with an existing policy, receives determination results from the policy determination unit 105, and outputs post-determination policies 106 in which the determination results are associated with the post-conversion policies 103.

The policy determination unit 105 functions as a policy decision point (PDP), determines whether each of the post-conversion policies 103 inquired from the PDP inquiry unit 104 conforms with the existing policy, and notifies the PDP inquiry unit 104 of the determination results (consistency results).

The policy determination result check unit 107 refers to the post-determination policies 106, determines whether all the post-determination policies 106 conform with the existing policy, and notifies the policy decision unit 108 of the determination results when all the post-determination policies 106 satisfy the existing policy (when YES), and notifies the policy automatic correction unit 109 of the determination result when any of the post-determination policies 106 does not satisfy the existing policy (when NO). The policy determination result check unit 107 may display and output the post-determination policies 106 so that the post-determination policies 106 are recognizable by an administrator.

The similarity policy extraction unit 111 outputs, to the policy automatic correction unit 109, a correction policy candidate obtained by correcting a policy having a data attribute similar to a data attribute of the input policy 11 based on the policy rule stored in the policy rule storage unit 102.

When receiving a notification from the policy determination result check unit 107 that the existing policy is not satisfied, the policy automatic correction unit 109 corrects the input policy 11 to a policy that is consistent with the existing policy. The correction policy candidate extracted from the similarity policy extraction unit 111 may be corrected.

The policy reception unit 110 receives a correction policy to be newly applied from a data administrator. The policy reception unit 110 may receive a correction policy by receiving a correction to the policy created by the policy automatic correction unit 109.

When the policy decision unit 108 receives a notification from the policy determination result check unit 107 that all the post-determination policies 106 satisfy the existing policy, the policy decision unit 108 decides, as an established policy 112 to be set in the PAP server 10, any one of the input policy 11, the correction policy received from the policy automatic correction unit 109, and an administrator input policy received by the policy reception unit 110 from the data administrator, and transmits the established policy 112 to the PAP server 10.

Figure 2:
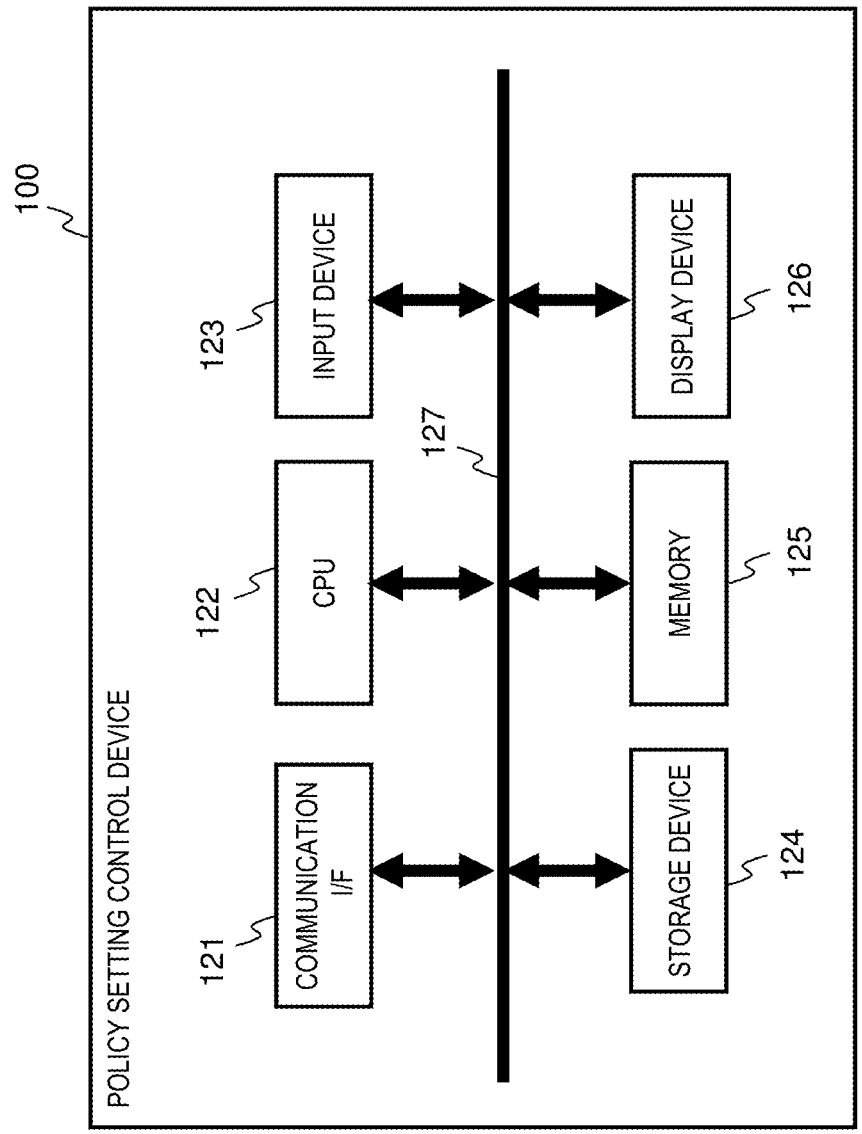
FIG. 2 is a configuration diagram of a policy setting control device according to one embodiment.

FIG. 2 is a configuration diagram of the policy setting control device according to one embodiment.

The policy setting control device 100 is implemented by, for example, a computer such as a personal computer (PC) or a server device, and includes a communication interface (I/F) 121, a central processing unit (CPU) 122 as an example of a processor, an input device 123, a storage device 124, a memory 125, and a display device 126. The communication I/F 121, the CPU 122, the input device 123, the storage device 124, the memory 125, and the display device 126 are connected via an internal bus 127.

The communication I/F 121 is, for example, an interface such as a wired LAN card or a wireless LAN card, and communicates with another device (for example, the PAP server 10, the PIP server 20) via a network (not shown).

The CPU 122 executes various kinds of processing in accordance with a program stored in the memory 125 and/or the storage device 124. In the present embodiment, the policy mapping unit 101, the PDP inquiry unit 104, the policy determination unit 105, the policy determination result check unit 107, the policy decision unit 108, the policy automatic correction unit 109, the policy reception unit 110, and the similarity policy extraction unit 111 are implemented by the CPU 122 executing a policy setting control program stored in the memory 125.

The memory 125 is, for example, a random access memory (RAM), and stores a program (for example, the policy setting control program) executed by the CPU 122 and necessary information. The memory 125 stores the post-conversion policies 103 and the post-determination policies 106.

The storage device 124 is, for example, a hard disk and a flash memory, and stores a program executed by the CPU 122 and data used by the CPU 122. In the present embodiment, the storage device 124 corresponds to the policy rule storage unit 102.

The input device 123 is, for example, a mouse and a keyboard, and receives information input by a user. The display device 126 is, for example, a display, and displays and outputs a user interface including various kinds of information.

Next, policy decision processing will be described.

Figure 3:
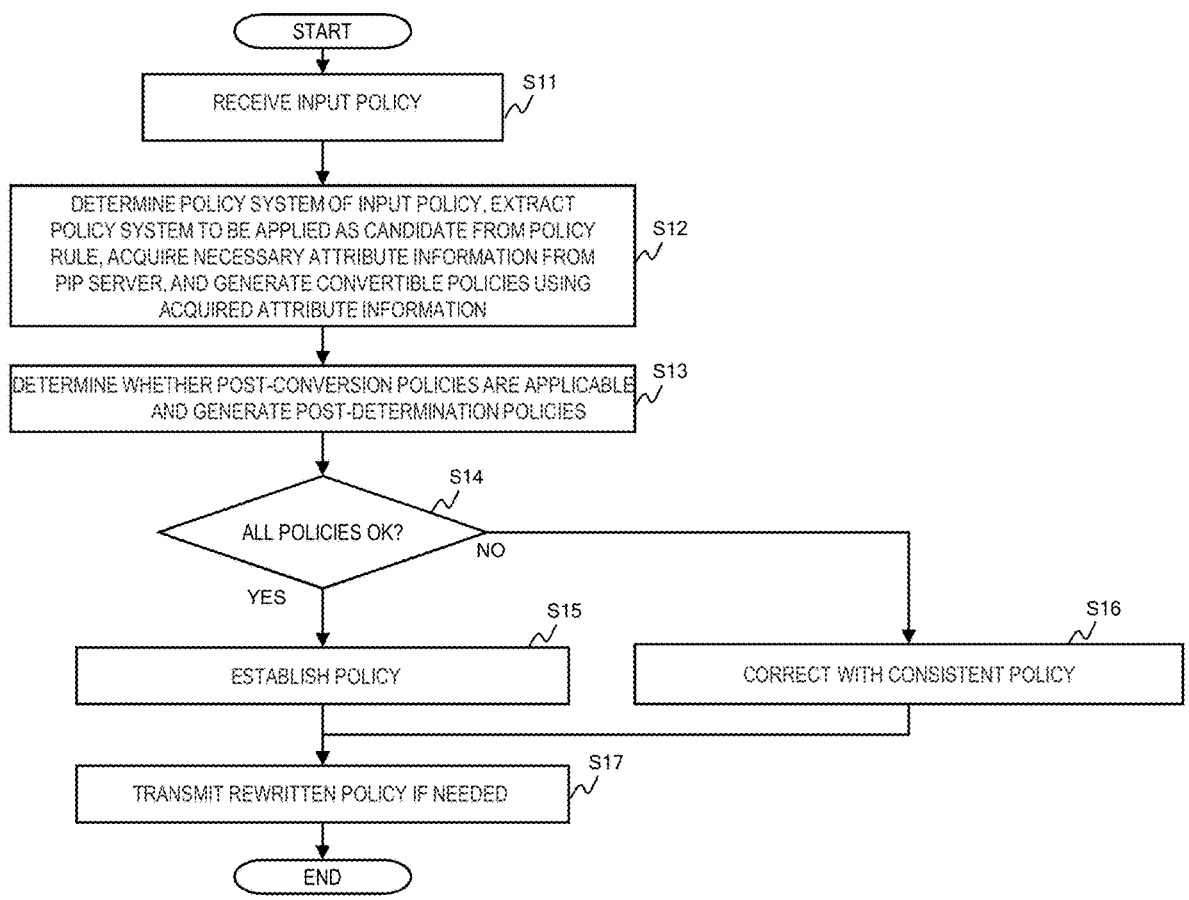
FIG. 3 is a flowchart of policy decision processing according to one embodiment.

FIG. 3 is a flowchart of the policy decision processing according to one embodiment.

The policy mapping unit 101 receives, from the PAP server 10, the input policy 11 which is a candidate to be newly set (step S11).

Next, the policy mapping unit 101 determines a policy system of the input policy 11, extracts a policy system of the existing policy applicable to the input policy 11 from the policy rule storage unit 102, acquires attribute information necessary for the extracted policy system from the PIP server 20, and converts the input policy 11 according to the acquired attribute information to generate the post-conversion policies 103 (step S12).

Next, the PDP inquiry unit 104 causes the policy determination unit 105 to determine whether the post-conversion policies 103 conform with the existing policy, receive the determination results, and generate the post-determination policies 106 (step S13).

Next, the policy determination result check unit 107 refers to the post-determination policies 106, and determines whether the determination results for all the post-conversion policies are OK (step S14).

As a result, when all the determination results are OK (step S14: YES), the policy decision unit 108 establishes the input policy 11 as a policy to be set (step S15), and the processing proceeds to step S17. On the other hand, when any one of the determination results is NG (step S14: NO), the policy automatic correction unit 109 corrects the input policy 11 with a consistent policy (step S16), and the processing proceeds to step S17.

In step S17, when the policy reception unit 110 receives a correction from the data administrator, the policy decision unit 108 rewrites the input policy 11 or the policy corrected by the policy automatic correction unit 109 in accordance with an instruction from the data administrator, generates an established policy, transmits the established policy to the PAP server 10, and ends the policy decision processing.

Next, a first processing operation example of the policy setting control device 100 according to a first embodiment will be described.

Figure 4:
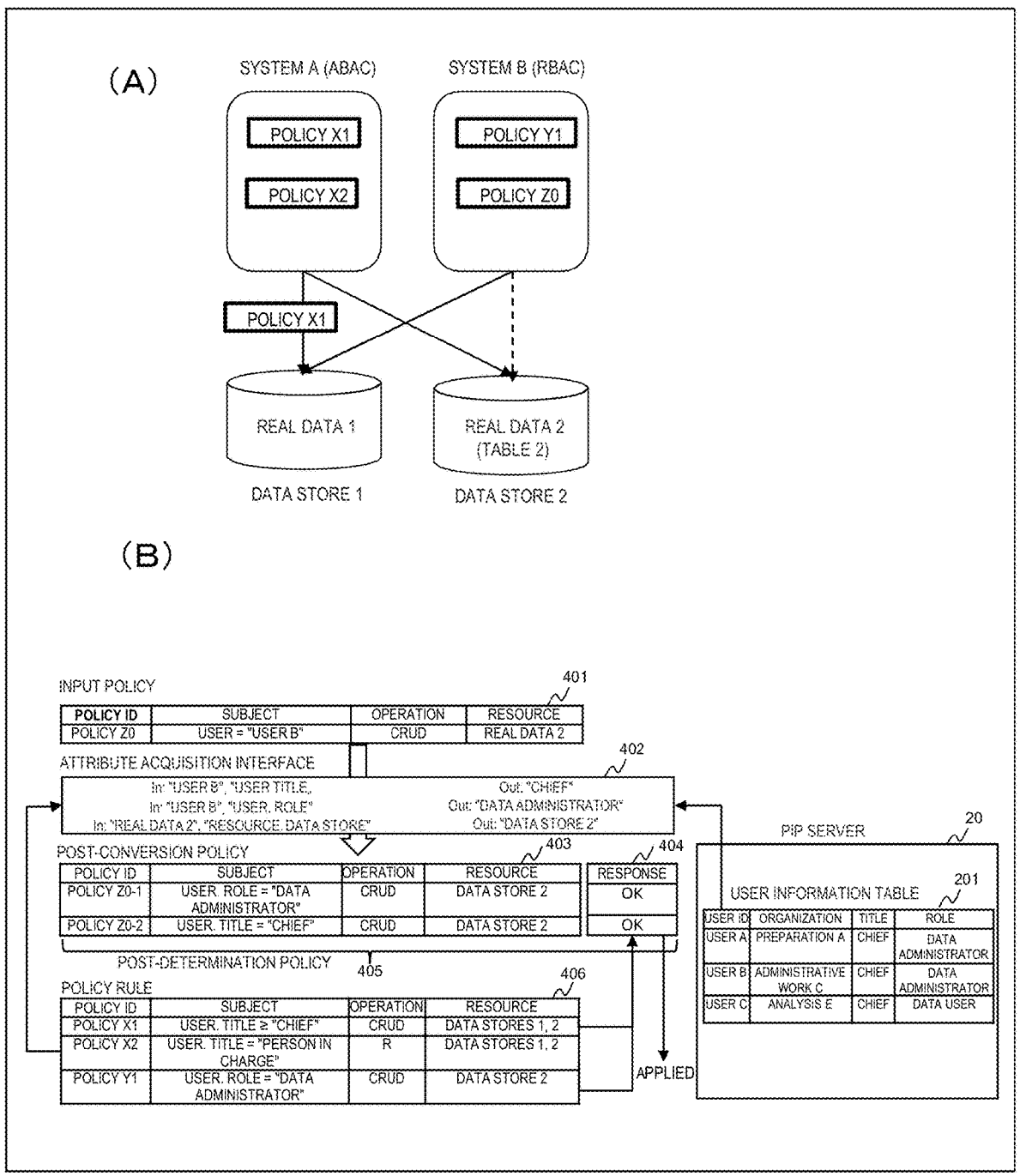
FIG. 4 is a diagram showing a first processing operation example of a policy setting control device according to a first embodiment.

FIG. 4 is a diagram showing the first processing operation example of the policy setting control device according to the first embodiment.

Here, in the first processing operation example, as shown in (A) of FIG. 4, data resources include real data 1 in a data store 1, real data 2 (table 2) in a data store 2, policies X1 and X2 in a system A in which attribute based access control (ABAC) is adopted, and a policy Y1 in accordance with a system B in which role based access control (RBAC) is adopted. A case in which a policy Z0 is set as a candidate policy (input policy) to be newly set will be described with reference to (B) of FIG. 4.

In an input policy 401, a policy ID is the policy Z0, a subject is a user B, an operation is create/read/update/delete (CRUD), and a resource is the real data 2.

The PIP server 20 stores a user information table 201 that manages user attributes. The user information table 201 stores entries including attribute information of each user. The entries in the user information table 201 include fields of a user ID, an organization, a title, and a role. In the user ID, user IDs corresponding to the entries are stored. In the organization, organization names to which the users corresponding to the entries belong are stored. In the title, titles of the users corresponding to the entries are stored. In the role, roles of the users corresponding to the entries are stored. In the example of FIG. 4, a user A belongs to an organization of preparation A, has a title of chief, and has a role of data administrator. The user B belongs to an organization of administrative work C, has a title of chief, and has a role of data administrator. A user C belongs to an organization of analysis E, has a title of chief, and has a role of data user.

A policy rule 406 of the policy rule storage unit 102 stores one or more policies including a policy ID, a subject, an operation, and a resource. In the example of FIG. 4, the policy rule 406 includes the policy X1, the policy X2, and the policy Y1.

The policy mapping unit 101 receives the policy Z0 as the input policy 401. Next, the policy mapping unit 101 refers to the policy rule 406 and specifies an item (input item) that needs to be input to the PIP server 20 in order to acquire attribute information on the subject and/or the resource. For example, in the example of FIG. 4, a user title and a user role are specified for a subject based on information set for the subject of the policy rule 406, and a data store is specified for a resource. Next, the policy mapping unit 101 inputs, to the PIP server 20, attribute inquiry information in which the specified input item is associated with a setting value of the subject and/or the resource of the input policy 401. Here, in the example of FIG. 4, the attribute inquiry information is information starting from "in:" of an attribute acquisition interface 402.

When the attribute inquiry information is acquired from the policy mapping unit 101, the PIP server 20 refers to the user information table 201 or the like, specifies attribute information corresponding to the subject and/or the resource included in the attribute inquiry information, and returns the attribute information as inquiry response information to the policy mapping unit 101. Here, in the example of FIG. 4, the inquiry response information is information starting from "Out:" of the attribute acquisition interface 402. In the example of FIG. 4, the chief is returned as the title of the user B, the data administrator is returned as the role of the user B, and the data store 2 is returned as the data store to which the real data 2 belongs.

Next, the policy mapping unit 101 applies the acquired attributes to the input policy 401 to convert the policy, thereby generating one or more post-conversion policies 403. Here, the post-conversion policies to be generated may be policies corresponding to all possible combinations, or may not include a policy that is considered unnecessary for determination.

In the example of FIG. 4, the policy mapping unit 101 generates, as the post-conversion policies 403, a policy Z0-1 in which the subject is the user role=the data administrator, the operation is CRUD, and the resource is the data store 2, and a policy Z0-2 in which the subject is the user title=the chief, the operation is CRUD, and the resource is the data store 2.

Next, the PDP inquiry unit 104 causes the policy determination unit 105 to determine whether each of the post-conversion policies 403 conforms with the existing policy (in the present embodiment, basically the same content as the policy rule 406), receives determination results (response) 404, and generates post-determination policies 405 by combining the post-conversion policies 403 and the determination results 404.

In the example of FIG. 4, the policy determination unit 105 determines that the policy Z0-1 conforms with the policy Y1 and returns OK (YES), and determines that the policy Z0-2 conforms with the policy X1 and returns OK (YES).

Next, the policy determination result check unit 107 refers to the post-determination policies 405 and determines whether the determination results for all the policies are OK. In this example, since the determination results for all the policies are OK, the policy decision unit 108 is notified that all the policies are OK.

When the policy decision unit 108 receives a notification from the policy determination result check unit 107 that the determination results for all the policies are OK, the policy reception unit 110 decides the input policy 401 as the established policy 112 to be set in the PAP server 10, and transmits the established policy 112 to the PAP server 10. Thereafter, the PAP server 10 registers the established policy 112, and performs access determination using the registered established policy 112.

According to this processing, a consistent input policy can be appropriately registered in the PAP server 10 in a plurality of systems.

Next, a second processing operation example of the policy setting control device 100 according to the first embodiment will be described. The same components as those of the first processing operation example are denoted by the same reference numerals, and redundant description thereof may be omitted.

Figure 5:
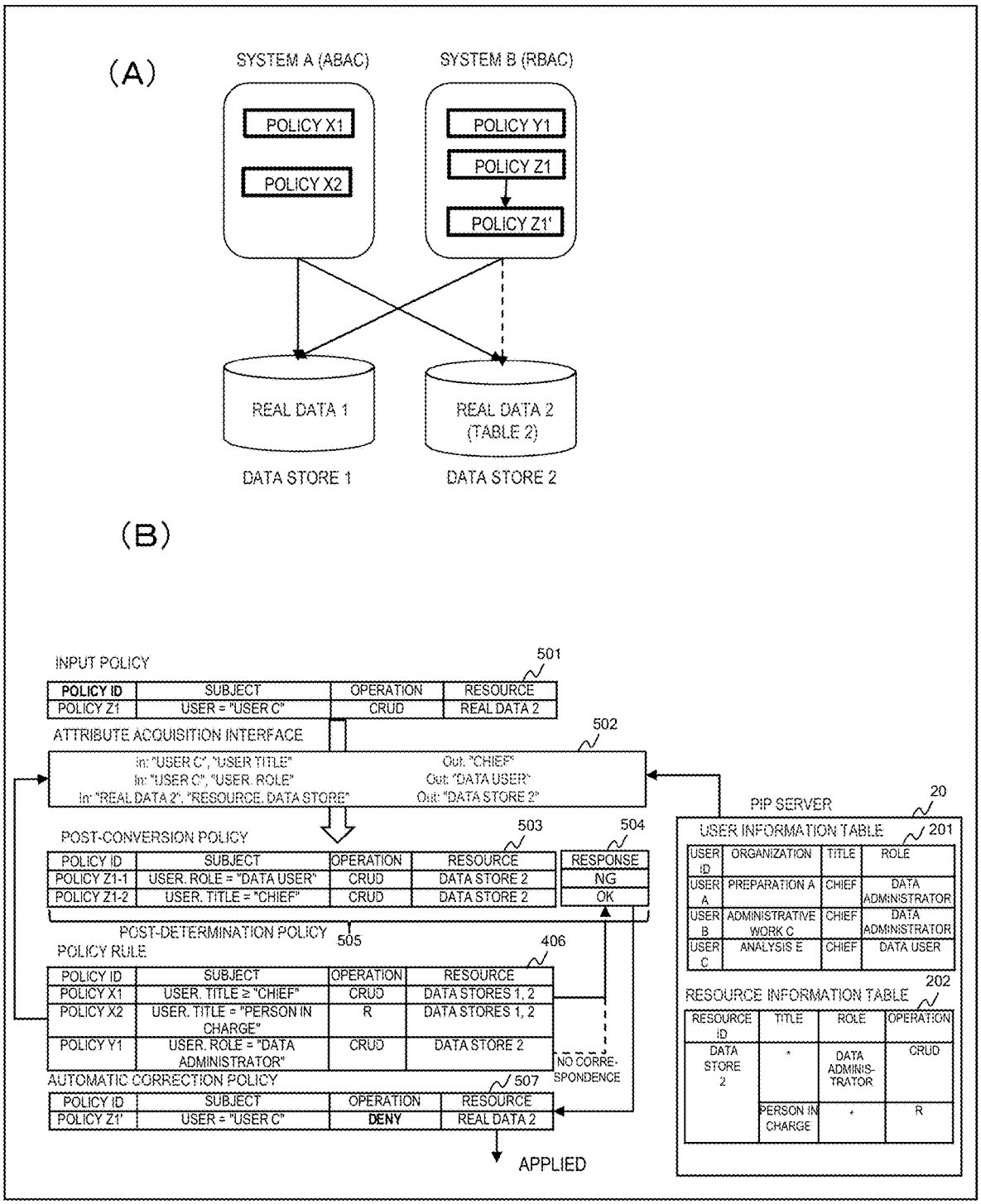
FIG. 5 is a diagram showing a second processing operation example of the policy setting control device according to the first embodiment.

FIG. 5 is a diagram showing the second processing operation example of the policy setting control device according to the first embodiment.

Here, in the second processing operation example, as shown in (A) of FIG. 5, data resources include the real data 1 in the data store 1, the real data 2 (table 2) in the data store 2, the policies X1 and X2 in the system A in which ABAC is adopted, and the policy Y1 in accordance with the system B in which RBAC is adopted. A case in which a policy Z1 is set as a candidate policy (input policy) to be newly set and a corrected policy Z1' is set instead of the policy Z1 will be described with reference to (B) of FIG. 5.

In the input policy 501, a policy ID is the policy Z1, a subject is user="user C", an operation is CRUD, and a resource is the real data 2.

The PIP server 20 stores a user information table 201 that manages user attributes and a resource information table 202. The resource information table 202 stores entries including attribute information corresponding to a resource. The entries in the resource information table 202 include fields of a resource ID, a title, a role, and an operation. In the resource ID, resource IDs corresponding to the entries are stored. In the title, title names accessible to the resource corresponding to the entries are stored. When there is no designation of an accessible title, a symbol (for example, *) indicating that any title is ok is stored. In the role, roles accessible to the resource corresponding to the entries are stored. When there is no designation of an accessible role, a symbol (for example, *) indicating that any role is ok is stored. In the operation, an operation accessible to the resource corresponding to the entry is stored. In the example of FIG. 5, in the resource information table 202, access of CRUD is possible for the data store 2 when the role is the data administrator. In addition, access of R (Read) is possible for the data store 2 when the title is a person in charge.

The policy mapping unit 101 receives the policy Z1 as the input policy 501. Next, the policy mapping unit 101 refers to the policy rule 406 and specifies an item (input item) that needs to be input to the PIP server 20 in order to acquire attribute information on the subject and/or the resource. For example, in the example of FIG. 5, a user title and a user role are specified for a subject based on information set for the subject of the policy rule 406, and a data store is specified for a resource. Next, the policy mapping unit 101 inputs, to the PIP server 20, attribute inquiry information in which the specified input item is associated with a setting value of the subject and/or the resource of the input policy 501. Here, in the example of FIG. 5, the attribute inquiry information is information starting from "in:" of an attribute acquisition interface 502.

When the attribute inquiry information is acquired from the policy mapping unit 101, the PIP server 20 refers to the user information table 201, the resource information table 202 or the like, specifies attribute information corresponding to the subject and/or the resource included in the attribute inquiry information, and returns the attribute information as inquiry response information to the policy mapping unit 101. Here, in the example of FIG. 5, the inquiry response information is information starting from "Out:" of the attribute acquisition interface 502. In the example of FIG. 5, the chief is returned as a title of the user C, the data user is returned as a role of the user C, and the data store 2 is returned as the data store to which the real data 2 belongs.

Next, the policy mapping unit 101 applies the acquired attributes to the input policy 501 to convert the policy, thereby generating one or more post-conversion policies 503. Here, the post-conversion policies to be generated may be policies corresponding to all possible combinations, or may not include policies that are considered unnecessary for determination.

In the example of FIG. 5, the policy mapping unit 101 generates, as the post-conversion policies 503, a policy Z1-1 in which the subject is the user role=the data user, the operation is CRUD, and the resource is the data store 2, and a policy Z1-2 in which the subject is the user title=the data user, the operation is CRUD, and the resource is the data store 2.

Next, the PDP inquiry unit 104 causes the policy determination unit 105 to determine whether each of the post-conversion policies 503 conforms with the existing policy, receives determination results (response) 504, and generates post-determination policies 505 by combining the post-conversion policies 503 and the determination results 504.

In the example of FIG. 5, the policy determination unit 105 determines that the policy Z1-1 does not conform with the policy Y1 and returns NG (NO), and determines that the policy Z1-2 conforms with the policy X1 and returns OK (YES).

Next, the policy determination result check unit 107 refers to the post-determination policies 505 and determines whether the determination results for all the policies are OK. In this example, since the determination results for all the policies are not OK, the policy automatic correction unit 109 is notified that the determination result is NG.

When the policy automatic correction unit 109 receives the notification from the policy determination result check unit 107 that the determination result is NG, the policy automatic correction unit 109 corrects the input policy 501 to a policy that is consistent with the policy rule 406 (automatic correction policy 507), and passes the automatic correction policy 507 to the policy decision unit 108. As a method of correcting a policy to a consistent policy, for example, an operation of the input policy 501 is set to DENY (access not allowed).

The policy decision unit 108 decides the automatic correction policy 507 received from the policy automatic correction unit 109 as the established policy 112 to be set in the PAP server 10, and transmits the established policy 112 to the PAP server 10.

The automatic correction policy 507 generated by the policy automatic correction unit 109 may be checked in the same manner as the input policy 501, and may be passed to the policy decision unit 108 only when the determination results for all the post-conversion policies are OK.

According to this processing, an input policy can be corrected to an appropriate and consistent policy and registered.

Next, a processing operation example of a policy setting control device according to a second embodiment will be described. Since a basic configuration of the policy setting control device according to the second embodiment is the same as that of the policy setting control device 100 according to the first embodiment, for convenience, the same or corresponding components as those of the first embodiment are denoted by the same reference numerals, and redundant description thereof may be omitted.

Figure 6:
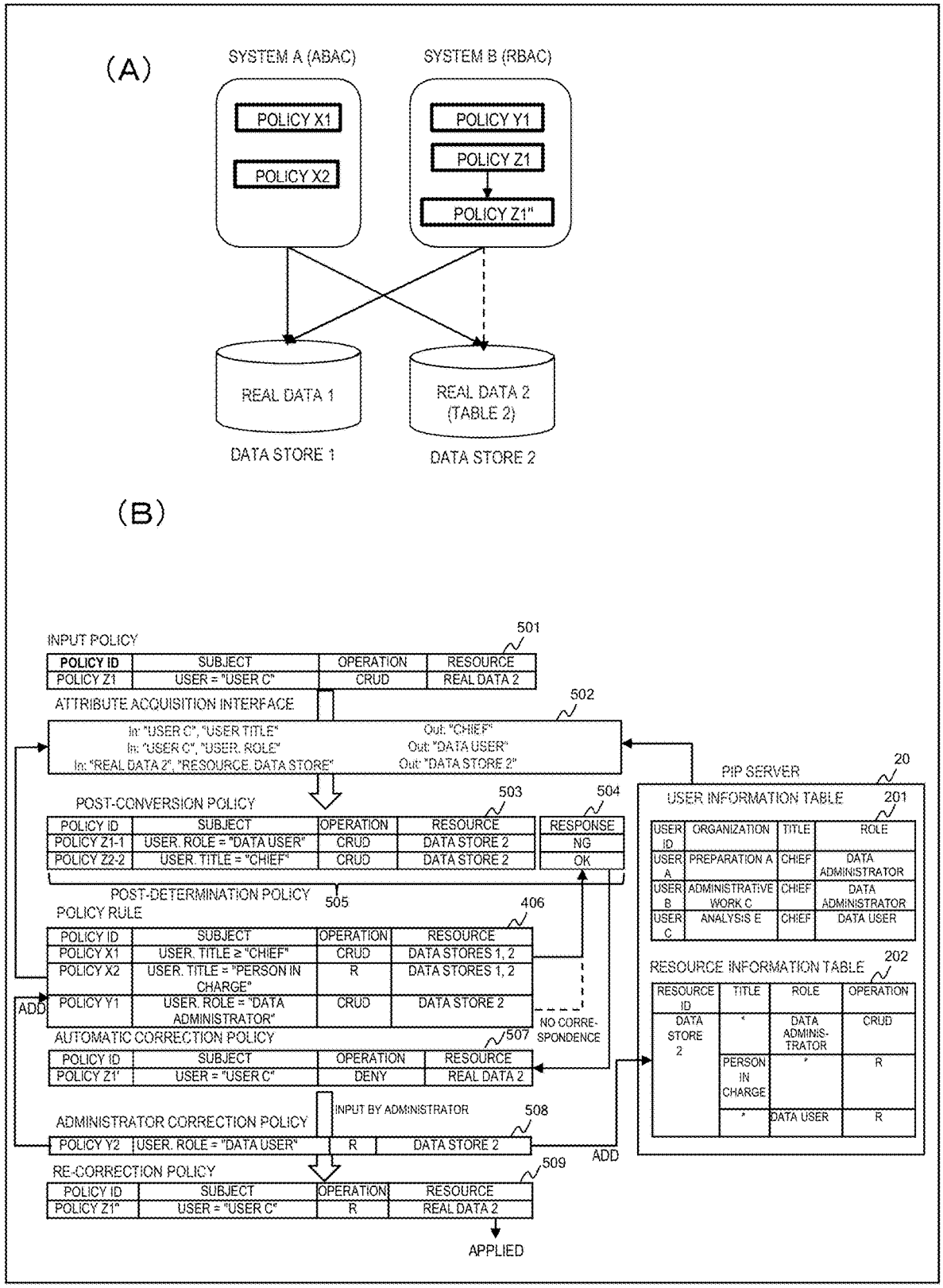
FIG. 6 is a diagram showing a processing operation example of a policy setting control device according to a second embodiment.

FIG. 6 is a diagram showing the processing operation example of the policy setting control device according to the second embodiment.

Here, in the processing operation example, as shown in (A) of FIG. 6, data resources include the real data 1 in the data store 1, the real data 2 (table 2) in the data store 2, the policies X1 and X2 in the system A in which ABAC is adopted, and the policy Y1 in accordance with the system B in which RBAC is adopted. A case in which the policy Z1 is set as a candidate policy (input policy) to be newly set and a policy Z1" based on the correction of an administrator is set instead of the policy Z1 will be described with reference to (B) of FIG. 6.

The PIP server 20 stores the user information table 201 that manages the user attributes and the resource information table 202. An entry in a third row in the resource information table 202 does not exist at the start of the processing.

In the processing operation example, the processing up to the generation of the automatic correction policy 507 in the second processing operation example according to the first embodiment described above is the same.

The policy reception unit 110 displays the generated automatic correction policy 507 and receives a correction policy (administrator correction policy 508) to be newly applied from the data administrator. In the example of FIG. 6, in the administrator correction policy 508, a policy ID is the policy Z1', a subject is user role="data user", an operation is R, and a resource is the data store 2.

The policy decision unit 108 corrects the automatic correction policy 507 (for example, corrects an operation to the changed content) based on the administrator correction policy received from the data administrator by the policy reception unit 110, generates a re-correction policy 509, decides the re-correction policy 509 as the established policy 112 to be set in the PAP server 10, and transmits the re-correction policy 509 to the PAP server 10. The policy decision unit 108 may add an entry corresponding to the administrator correction policy 508 (a third entry of the resource information table 202 in (B) of FIG. 6) to the resource information table 202.

According to this processing, it is possible to correct the input policy to a consistent policy, receive the correction of the administrator with respect to the policy, and register the re-corrected policy.

Next, a processing operation example of a policy setting control device according to a third embodiment will be described. Since a basic configuration of the policy setting control device according to the third embodiment is the same as that of the policy setting control device 100 according to the first embodiment, for convenience, the same or corresponding components as those of the first embodiment are denoted by the same reference numerals, and redundant description thereof may be omitted.

Figure 7:
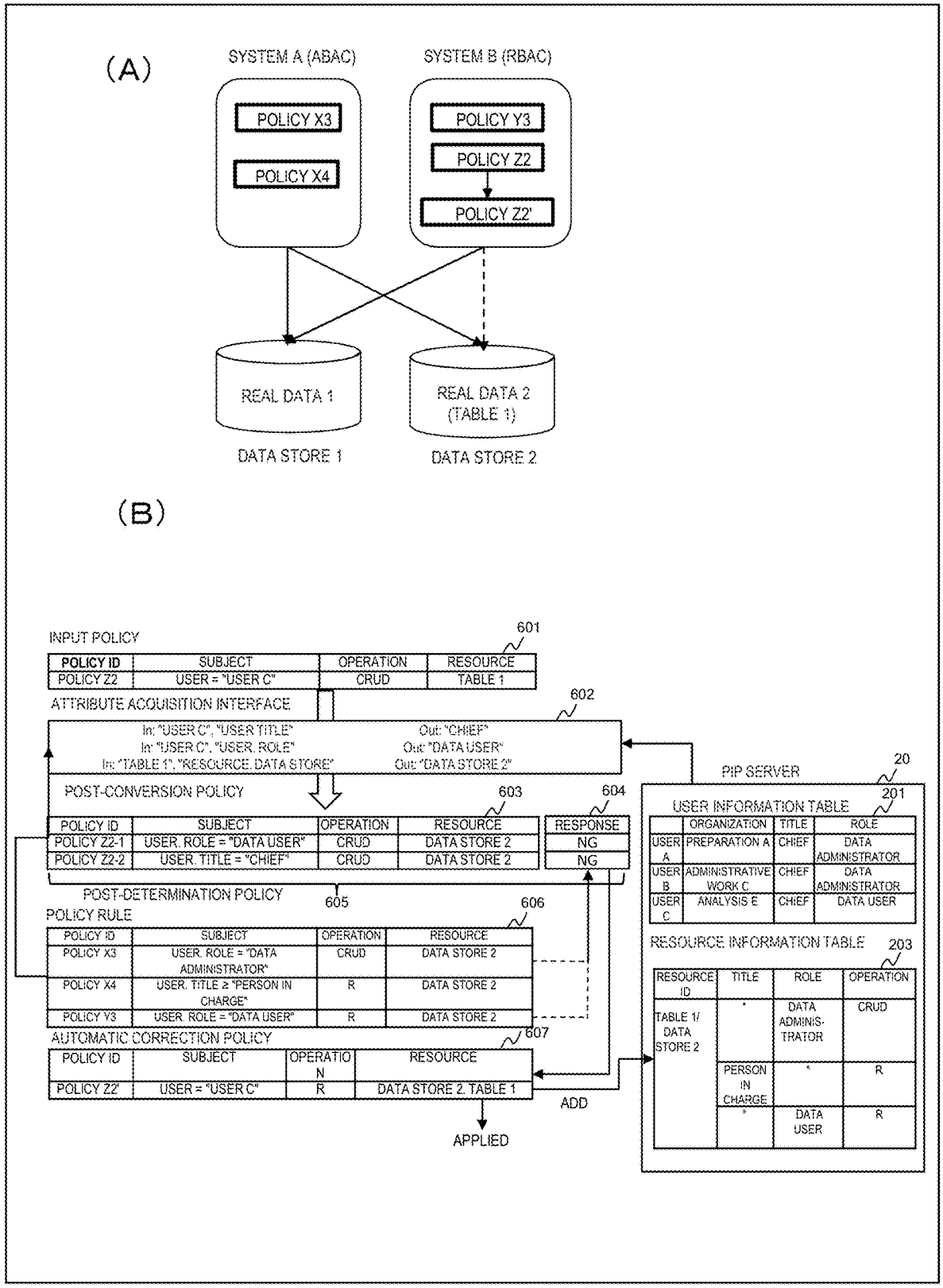
FIG. 7 is a diagram showing a processing operation example of a policy setting control device according to a third embodiment.

FIG. 7 is a diagram showing the processing operation example of the policy setting control device according to the third embodiment.

Here, in the processing operation example, as shown in (A) of FIG. 7, data resources include the real data 1 in the data store 1, the real data 2 (table 1) in the data store 2, policies X3 and X4 in the system A in which ABAC is adopted, and a policy Y3 in accordance with the system B in which RBAC is adopted. A case in which a policy Z2 is set as a candidate policy (input policy) to be newly set and an automatically generated policy Z2' is set instead of the policy Z2 will be described with reference to (B) of FIG. 7.

In the input policy 601, a policy ID is the policy Z2, a subject is user="user C", an operation is CRUD, and a resource is the table 1.

The PIP server 20 stores the user information table 201 that manages the user attributes and a resource information table 203. The resource information table 203 stores entries corresponding to the resources. A configuration of the entries in the resource information table 203 is the same as that of the resource information table 202 in FIG. 6. In the example of FIG. 7, in the resource information table 203, access of CRUD is possible for the table 1/the data store 2 when the role is the data administrator. Access of R (Read) is possible for the table 1/the data store 2 when the title is the person in charge. In addition, access of R is possible for the table 1/the data store 2 when the role is the data user. An entry in a third row in the resource information table 203 does not exist at the start of the processing.

A policy rule 606 of the policy rule storage unit 102 stores one or more policies including a policy ID, a subject, an operation, and a resource. In the example of FIG. 7, the policy rule 606 includes the policy X3, the policy X4, and the policy Y3.

The policy mapping unit 101 receives the policy Z2 as the input policy 601. Next, the policy mapping unit 101 refers to the policy rule 606 and specifies an item (input item) that needs to be input to the PIP server 20 in order to acquire attribute information on the subject and/or the resource. For example, in the example of FIG. 7, a user title and a user role are specified for a subject based on information set for the subject of the policy rule 606, and a data store is specified for a resource. Next, the policy mapping unit 101 inputs, to the PIP server 20, attribute inquiry information in which the specified input item is associated with a setting value of the subject and/or the resource of the input policy 601. Here, in the example of FIG. 7, the attribute inquiry information is information starting from "in:" of an attribute acquisition interface 602.

When the attribute inquiry information is acquired from the policy mapping unit 101, the PIP server 20 refers to the user information table 201, the resource information table 203 or the like, specifies attribute information corresponding to the subject and/or the resource included in the attribute inquiry information, and returns the attribute information as inquiry response information to the policy mapping unit 101. Here, in the example of FIG. 7, the inquiry response information is information starting from "Out:" of the attribute acquisition interface 602. In the example of FIG. 7, the chief is returned as the title of the user C, the data user is returned as the role of the user C, and the data store 2 is returned as the data store to which the table 1 belongs.

Next, the policy mapping unit 101 applies the acquired attributes to the input policy 601 to convert the policy, thereby generating one or more post-conversion policies 603. Here, the post-conversion policies to be generated may be policies corresponding to all possible combinations, or may not include policies that are considered unnecessary for determination.

In the example of FIG. 7, the policy mapping unit 101 generates, as the post-conversion policies 603, a policy Z2-1 in which the subject is the user role=the data user, the operation is CRUD, and the resource is the data store 2, and a policy Z2-2 in which the subject is the user title=the data user, the operation is CRUD, and the resource is the data store 2.

Next, the PDP inquiry unit 104 causes the policy determination unit 105 to determine whether each of the post-conversion policies 603 conforms with the existing policy, receives determination results (response) 604, and generates post-determination policies 605 by combining the post-conversion policies 603 and the determination results 604.

In the example of FIG. 7, the policy determination unit 105 determines that the policy Z2-1 does not conform with the policy Y3 and returns NG (NO), and determines that the policy Z2-2 does not conform with the policy X3 and returns NG (NO).

Next, the policy determination result check unit 107 refers to the post-determination policies 605 and determines whether the determination results for all the policies are OK. In this example, since the determination results for all the policies are NG, the policy automatic correction unit 109 is notified that the determination result is NG.

When the policy automatic correction unit 109 receives the notification from the policy determination result check unit 107 that the determination result is NG, the policy automatic correction unit 109 corrects the input policy 601 to a policy that is consistent with the policy rule 606 (automatic correction policy 607), and passes the automatic correction policy 607 to the policy decision unit 108. As a method of correcting a policy to a consistent policy, for example, an operation of the input policy 601 may be the same as an operation of a policy (for example, the policy Y3) of the policy rule 606 used for the determination of NG (in this example, R).

The policy decision unit 108 decides the automatic correction policy 607 received from the policy automatic correction unit 109 as the established policy 112 to be set in the PAP server 10, and transmits the established policy 112 to the PAP server 10. The policy decision unit 108 may add an entry corresponding to the automatic correction policy 607 (a third entry of the resource information table 203 in (B) of FIG. 7) to the resource information table 203.

The automatic correction policy 607 generated by the policy automatic correction unit 109 may be checked in the same manner as the input policy 601, and may be passed to the policy decision unit 108 only when the determination results for all the post-conversion policies are OK.

According to this processing, an input policy can be corrected and registered to a more consistent and more appropriate policy without administrator involvement.

Next, a processing operation example of a policy setting control device according to a fourth embodiment will be described. Since a basic configuration of the policy setting control device according to the fourth embodiment is the same as that of the policy setting control device 100 according to the first embodiment, for convenience, the same or corresponding components as those of the first embodiment are denoted by the same reference numerals, and redundant description thereof may be omitted.

Figure 8:
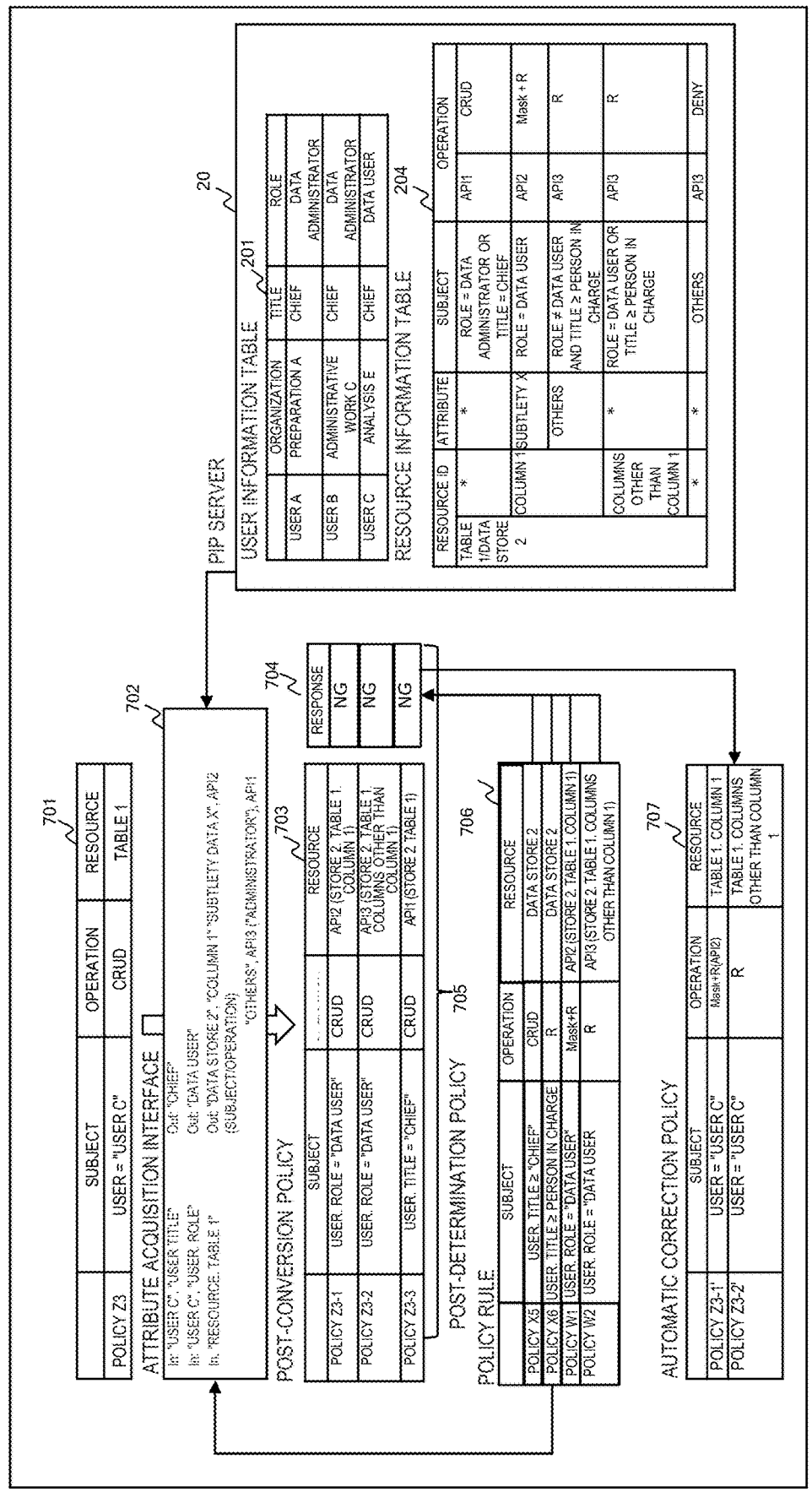
FIG. 8 is a diagram showing a first processing operation example of a policy setting control device according to a fourth embodiment.

FIG. 8 is a diagram showing a first processing operation example of the policy setting control device according to the fourth embodiment.

In an input policy 701, a policy ID is a policy Z3, a subject is user="user C", an operation is CRUD, and a resource is the table 1.

The PIP server 20 stores the user information table 201 that manages the user attributes and a resource information table 204. The resource information table 204 stores entries corresponding to the resource. The entries of the resource information table 204 include fields of a resource ID, an attribute, a subject, and an operation. In the resource ID, resource IDs corresponding to the entries are stored. The resource may be set in units of tables in a data store, or may be set in units of columns in a table. In the attribute, attributes of resource data corresponding to the entries are stored. Examples of the attribute include subtlety and others. A plurality of attributes may be associated with one resource. In the subject, subjects that can access the resource corresponding to the entries are stored. In the operation, an application programming interface (API) that can be used to access the resource corresponding to the entry and an accessible operation are stored.

In the example of FIG. 8, the resource information table 204 indicates, that for the table 1 in the data store 2 (sometimes referred to as table 1/data store 2), (1) a subject whose role is a data administrator or whose title is a chief (role=data administrator or title=chief) can access with CRUD by an API1; (2) for subtlety X in the column 1 of the table 1 in the data store 2, a subject whose role is a data user can access with R (Mask+R) in a state where subtlety data is masked by an API2; (3) for the attributes other than the subtlety X in the column 1 of the table 1 in the data store 2, a subject whose role is not the data user and whose title is equal to or higher than the title of a person in charge can access with R by an API3; (4) for the columns other than the column 1 of the table 1 in the data store 2, a subject whose role is the data user or whose title is equal to or higher than the title of the person in charge can access with R by API3; and (5) for the table 1 in the data store 2, if (1) to (4) do not apply, access by API3 is DENY (impossible).

A policy rule 706 of the policy rule storage unit 102 stores one or more policies including a policy ID, a subject, an operation, and a resource. In the example of FIG. 8, the policy rule 706 includes the policy X5, the policy X6, a policy W1, and a policy W2. The policy X5 indicates that CRUD is possible for the data store 2 when the title of the subject is equal to or higher than the title of the chief, the policy X6 indicates that R is possible for the data store 2 when the title of the subject is equal to or higher than the title of the person in charge, the policy W1 indicates that, when the role of the subject is the data user, R in which information is masked is possible for the column 1 of the table 1 in the data store 2 by API2, and the policy W2 indicates that, when the role of the subject is the data user, R is possible by API3 for columns other than the column 1 of the table 1 in the data store 2.

The policy mapping unit 101 receives the policy Z3 as the input policy 701. Next, the policy mapping unit 101 refers to the policy rule 706 and specifies an item (input item) that needs to be input to the PIP server 20 in order to acquire attribute information on the subject and/or the resource. For example, in the example of FIG. 8, a user title and a user role are specified for a subject based on information set for the subject of the policy rule 706, and a data store is specified for a resource. Next, the policy mapping unit 101 inputs, to the PIP server 20, attribute inquiry information in which the specified input item is associated with a setting value of the subject and/or the resource of the input policy 701. Here, in the example of FIG. 8, the attribute inquiry information is information starting from "in:" of the attribute acquisition interface 702.

When the attribute inquiry information is acquired from the policy mapping unit 101, the PIP server 20 refers to the user information table 201 or the like, specifies attribute information corresponding to the subject and/or the resource included in the inquiry information, and returns the attribute information as inquiry response information to the policy mapping unit 101. Here, in the example of FIG. 8, the inquiry response information is information starting from "Out:" of the attribute acquisition interface 702. In the example of FIG. 8, the chief is returned as the title of the user C, the data user is returned as the role of the user C, and as resources and APIs related to the table 1, the data store 2, column 1 subtlety data X, API2 (subject/operation), others, API3 (administrator), and API1 are returned.

Next, the policy mapping unit 101 applies the acquired attributes to the input policy 701 to convert the policy, thereby generating one or more post-conversion policies 703. Here, the post-conversion policies to be generated may be policies corresponding to all possible combinations, or may not include policies that are considered unnecessary for determination.

In the example of FIG. 8, the policy mapping unit 101 generates, as the post-conversion policies 703, a policy Z3-1 in which the subject is user role=data user, the operation is CRUD, and API2 is used for the column 1 of the table 1 in the data store 2, a policy Z3-2 in which the subject is user title=data user, the operation is CRUD, and API3 is used for the columns other than the column 1 of the table 1 in the data store 2, and a policy Z3-3 in which the subject is user title=chief, the operation is CRUD, and API1 is used for the table 1 in the data store 2.

Next, the PDP inquiry unit 104 causes the policy determination unit 105 to determine whether each of the post-conversion policies 703 conforms with the existing policy (in the present embodiment, basically the same content as the policy rule 706), receives determination results (response) 704, and generates post-determination policies 705 by combining the post-conversion policies 703 and the determination results 704.

In the example of FIG. 8, the policy determination unit 105 determines that the policy Z3-1 does not conform with the policy W1 and returns NG (NO), determines that the policy Z3-2 does not conform with the policy W2 and returns NG (NO), and determines that the policy Z3-3 does not conform with the policies X5 and X6 and returns NG (NO).

Next, the policy determination result check unit 107 refers to the post-determination policies 705 and determines whether the determination results for all the policies are OK.

In this example, since the determination results for all the policies are NG, the policy automatic correction unit 109 is notified that the determination result is NG.

When the policy automatic correction unit 109 receives the notification from the policy determination result check unit 107 that the determination result is NG, the policy automatic correction unit 109 corrects the input policy 701 to a policy that is consistent with the policy rule 706 (automatic correction policy 707), and passes the automatic correction policy 707 to the policy decision unit 108. As a method of correcting a policy to a consistent policy, for example, an operation of the input policy 701 is the same as an operation of a policy of the policy rule 706 used for the determination of NG. For example, for the column 1 of the table 1 in the resource of the policy Z3, a policy (policy Z3-1') having the operation of the policy W1 (Mask+R using API2) is set, and for the columns other than the column 1 of the table 1 in the resource of the policy Z3, a policy (policy Z3-2') having the operation of the policy W2 (R using API3) is set.

The policy decision unit 108 decides the automatic correction policy 707 received from the policy automatic correction unit 109 as the established policy 112 to be set in the PAP server 10, and transmits the established policy 112 to the PAP server 10.

Next, a second processing operation example of the policy setting control device according to the fourth embodiment will be described.

Figure 9:
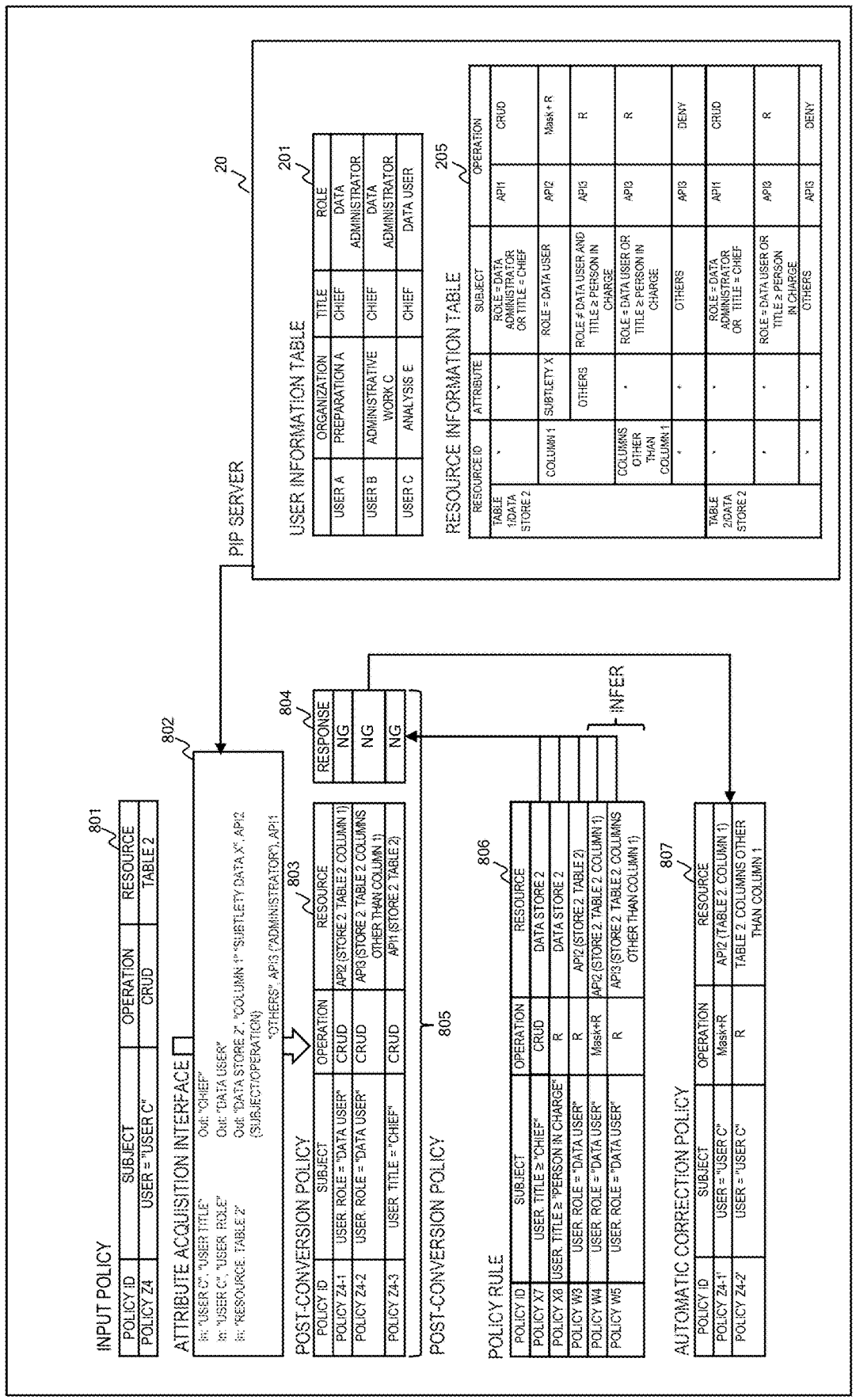
FIG. 9 is a diagram showing a second processing operation example of the policy setting control device according to the fourth embodiment.

FIG. 9 is a diagram showing the second processing operation example of the policy setting control device according to the fourth embodiment.

In the input policy 801, a policy ID is a policy Z4, a subject is user="user C", an operation is CRUD, and a resource is the table 2.

The PIP server 20 stores the user information table 201 that manages the user attributes and a resource information table 205. The resource information table 205 has the same configuration as the resource information table 204 in FIG. 8, and further includes entries not shown in FIG. 8. The resource information table 205 in FIG. 9 indicates, in addition to the entries in the resource information table 204, that for the table 2 in the data store 2 (sometimes referred to as table 2/data store 2), (1) a subject whose role is a data administrator or whose title is a chief (role=data administrator or title=chief) can access with CRUD by API1; (2) for the table 2 in the data store 2, a subject whose role is the data user or whose title is equal to or higher than the title of the person in charge can access with R by API3; (3) for the table 2 in the data store 2, if (1) and (2) do not apply, access by API3 is DENY (impossible).

A policy rule 806 of the policy rule storage unit 102 stores one or more policies including a policy ID, a subject, an operation, and a resource. In the example of FIG. 9, the policy rule 806 includes the policy X7, the policy X8, a policy W3, a policy W4, and a policy W5. The policy X7 indicates that CRUD is possible for the data store 2 when the title of the subject is equal to or higher than the title of the chief, the policy X8 indicates that R is possible for the data store 2 when the title of the subject is equal to or higher than the title of the person in charge, the policy W3 indicates that, when the role of the subject is the data user, R is possible by API2 for the table 2 in the data store 2, the policy W4 indicates that, when the role of the subject is the data user, R in which information is masked is possible by API2 for the column 1 of the table 2 in the data store 2, and the policy W5 indicates that, when the role of the subject is the data user, R is possible by API3 for columns other than the column 1 of the table 2 in the data store 2. The policy W4 and the policy W5 are policies created by the similarity policy extraction unit 111 specifying, as a policy for the table 2 (an example of a first resource), another table similar to the table 2 (an example of a second resource: table 1 in this embodiment) and inferring the specified other table as a policy in the table 2 based on a policy of which access is restricted.

The policy mapping unit 101 receives the policy Z4 as the input policy 801. Next, the policy mapping unit 101 refers to the policy rule 806 and specifies an item (input item) that needs to be input to the PIP server 20 in order to acquire attribute information on the subject and the resource. For example, in the example of FIG. 9, a user title and a user role are specified for a subject based on information set for the subject of the policy rule 806, and a data store is specified for a resource. Next, the policy mapping unit 101 inputs, to the PIP server 20, attribute inquiry information in which the specified input item is associated with a setting value of the subject and/or the resource of the input policy 801. Here, in the example of FIG. 9, the attribute inquiry information is information starting from "in:" of the attribute acquisition interface 802.

When the attribute inquiry information is acquired from the policy mapping unit 101, the PIP server 20 refers to the user information table 201 or the like, specifies attribute information corresponding to the subject and/or the resource included in the inquiry information, and returns the attribute information as inquiry response information to the policy mapping unit 101. Here, in the example of FIG. 9, the inquiry response information is information starting from "Out:" of the attribute acquisition interface 802. In the example of FIG. 9, the chief is returned as the title of the user C, the data user is returned as the role of the user C, and as resources and APIs related to the table 2, the data store 2, column 1 subtlety data X, API2 (subject/operation), others, API3 (administrator), and API1 are returned.

Next, the policy mapping unit 101 applies the acquired attributes to the input policy 801 to convert the policy, thereby generating one or more post-conversion policies 803. Here, the post-conversion policies to be generated may be policies corresponding to all possible combinations, or may not include policies that are considered unnecessary for determination.

In the example of FIG. 9, the policy mapping unit 101 generates, as the post-conversion policies 803, a policy Z4-1 in which the subject is the user role=the data user, the operation is CRUD, and API2 is used for the column 2 of table 2 in the data store 2, a policy Z4-2 in which the subject is user role=data user, the operation is CRUD, and API3 is used for the columns other than the column 1 of the table 2 in the data store 2, and a policy Z4-3 in which the subject is user title=chief, the operation is CRUD, and API1 is used for the table 1 in the data store 2.

Next, the PDP inquiry unit 104 causes the policy determination unit 105 to determine whether each of the post-conversion policies 803 conforms with the existing policy (in the present embodiment, basically the same content as the policy rule 806), receives determination results (response) 804, and generates post-determination policies 805 by combining the post-conversion policies 803 and the determination results 804.

In the example of FIG. 9, the policy determination unit 105 determines that the policy Z4-1 does not conform with the policy W4 and returns NG (NO), determines that the policy Z4-2 does not conform with the policy W5 and returns NG (NO), and determines that the policy Z4-3 does not conform with the policies X7 and X8 and returns NG (NO).

Next, the policy determination result check unit 107 refers to the post-determination policies 805 and determines whether the determination results for all the policies are OK. In this example, since the determination results for all the policies are NG, the policy automatic correction unit 109 is notified that the determination result is NG.

When the policy automatic correction unit 109 receives the notification from the policy determination result check unit 107 that the determination result is NG, the policy automatic correction unit 109 corrects the input policy 801 to a policy that is consistent with the policy rule 806 (automatic correction policy 807), and passes the automatic correction policy 807 to the policy decision unit 108. As a method of correcting a policy to a consistent policy, for example, an operation of the input policy 801 is the same as an operation of a policy of the policy rule 806 used for the determination of NG. For example, for the column 1 of the table 2 in the resource of the policy Z4, a policy (policy Z4-1') having the operation of the policy W4 (Mask+R using API2) is set, and for the columns other than the column 1 of the table 2 in the resource of the policy Z4, a policy (policy Z4-2') having the operation of the policy W5 (R using API3) is set.

The policy decision unit 108 decides the automatic correction policy 807 received from the policy automatic correction unit 109 as the established policy 112 to be set in the PAP server 10, and transmits the established policy 112 to the PAP server 10. Thereafter, the PAP server 10 registers the established policy 112, and performs access determination using the registered established policy 112.

According to this processing, even when a policy corresponding to subtlety information is not set in a table, it is possible to correct an input policy to a consistent and appropriate policy by utilizing a policy in other similar table and register the corrected policy.

The invention is not limited to the above-mentioned embodiments, and can be appropriately modified and implemented without departing from the gist of the invention.

For example, although the policy determination unit 105 is provided in the policy setting control device 100 in the above embodiments, a function of the policy determination unit 105 may be provided in an external device different from the policy setting control device 100.

In the embodiments described above, a part or all of the processing executed by a CPU may be executed by a hardware circuit. Programs in the embodiments described above may be installed from a program source. The program source may be a program distribution server or a storage medium (for example, a portable storage medium).

REFERENCE SIGNS LIST 1 policy utilization system
10 PAP server
20 PIP server
100 policy setting control device
101 policy mapping unit
102 policy rule storage unit
104 PDP inquiry unit
105 policy determination unit
107 policy determination result check unit
108 policy decision unit
109 policy automatic correction unit
110 policy reception unit 111 similarity policy extraction unit
122 CPU

The invention claimed is:

1. A policy setting control device for controlling setting of a policy for controlling access to a resource, the policy setting control device comprising:
a processor, wherein
the policy includes a resource to be accessed, a subject who accesses the resource, and an access operation,
the processor
receives input of a candidate policy which is a candidate to be newly set,
acquires an attribute value corresponding to values of a subject and a resource included in the candidate policy,
generates one or more post-conversion policies by changing the values of the subject and the resource included in the candidate policy to the acquired attribute value, and
sets the candidate policy as a new policy when all the generated post-conversion policies are consistent with an existing policy.

2. The policy setting control device according to claim 1, wherein
the processor determines whether the post-conversion policies are consistent with the existing policy.

3. The policy setting control device according to claim 1, wherein
when the post-conversion policy is not consistent with the existing policy, the processor changes not to execute an operation of the candidate policy and sets a changed policy.

4. The policy setting control device according to claim 1, wherein
when the post-conversion policy is not consistent with the existing policy, the processor changes the candidate policy to a narrower policy and sets a changed policy.

5. The policy setting control device according to claim 4, wherein
when the post-conversion policy is not consistent with the existing policy, the processor changes an operation of the candidate policy to a narrower operation.

6. The policy setting control device according to claim 5, wherein
the processor changes the operation of the candidate policy to an operation of masking and providing at least part of data of the resource of the candidate policy.

7. The policy setting control device according to claim 1, wherein
when the post-conversion policy is not consistent with the existing policy, the processor receives a correction policy from an administrator, changes the candidate policy to content corresponding to the correction policy, and sets the changed policy as a new policy.

8. The policy setting control device according to claim 7, wherein
when the correction policy is consistent with the existing policy, the processor changes the candidate policy to the content corresponding to the correction policy and sets the changed policy as the new policy.

9. The policy setting control device according to claim 1, wherein
the processor infers a policy for a first resource based on a policy for a second resource similar to the first resource of the candidate policy, and adds the inferred policy to the existing policy.

10. The policy setting control device according to claim 9, wherein
the first resource and the second resource are tables.

11. The policy setting control device according to claim 1, wherein
the processor displays and outputs the post-conversion policy and a consistency result between the post-conversion policy and the existing policy.

12. A policy setting control method performed by a policy setting control device for controlling setting of a policy for controlling access to a resource,
the policy including a resource to be accessed, a subject who accesses the resource, and an access operation,
the policy setting control method comprising:
by the policy setting control device,
receiving input of a candidate policy which is a candidate to be newly set,
acquiring an attribute value corresponding to values of a subject and a resource included in the candidate policy,
generating one or more post-conversion policies by changing the values of the subject and the resource included in the candidate policy to the acquired attribute value, and
setting the candidate policy as a new policy when all the generated post-conversion policies are consistent with an existing policy.

13. A policy setting control program to be run on a computer that controls setting of a policy for controlling access to a resource, wherein
the policy includes a resource to be accessed, a subject who accesses the resource, and an access operation, and
the policy setting control program causes the computer to:
receive input of a candidate policy which is a candidate to be newly set;
acquire an attribute value corresponding to values of a subject and a resource included in the candidate policy;
generate one or more post-conversion policies by changing the values of the subject and the resource included in the candidate policy to the acquired attribute value; and
set the candidate policy as a new policy when all the generated post-conversion policies are consistent with an existing policy.

* * * * *